(12) United States Patent
Ohka et al.

(10) Patent No.: US 11,124,141 B2
(45) Date of Patent: Sep. 21, 2021

(54) VEHICLE OCCUPANT PROTECTION DEVICE

(71) Applicant: TOYOTA JIDOSHA KABUSHIKI KAISHA, Toyota (JP)

(72) Inventors: Hideaki Ohka, Toyota (JP); Yusuke Mase, Nagoya (JP); Takashi Fujinami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 16/737,187

(22) Filed: Jan. 8, 2020

(65) Prior Publication Data

US 2020/0282933 A1 Sep. 10, 2020

(30) Foreign Application Priority Data

Mar. 4, 2019 (JP) .............................. JP2019-038357

(51) Int. Cl.
*B60R 21/015* (2006.01)
*B60R 21/01* (2006.01)
(Continued)

(52) U.S. Cl.
CPC .............. *B60R 21/01* (2013.01); *B60R 11/04* (2013.01); *B60R 21/0132* (2013.01); *B60R 21/01542* (2014.10); *B60R 21/01552* (2014.10); *B60R 21/01554* (2014.10); *B60R 21/203* (2013.01); *B60R 22/28* (2013.01); *G01S 13/58* (2013.01); *G01S 17/58* (2013.01);
(Continued)

(58) Field of Classification Search
CPC .......... B60R 2021/01279; B60R 2021/01542; B60R 2021/01552; B60R 2021/01315; B60R 2021/0102; B60R 2021/01006; B60R 21/01; B60R 21/0134
See application file for complete search history.

(56) References Cited

U.S. PATENT DOCUMENTS 8,538,674 B2 * 9/2013 Breuer ............... B60K 31/0008
701/301
2006/0022077 A1 2/2006 Hiramatsu
(Continued)

FOREIGN PATENT DOCUMENTS

JP 2006-062632 A 3/2006
JP 2009-190594 A 8/2009
(Continued)

*Primary Examiner* — James A English
(74) *Attorney, Agent, or Firm* — Oliff PLC

(57) ABSTRACT

A vehicle occupant protection device includes: a seat belt device having a selectable force limiter that is configured to switch a force limiter load from a high load to a low load; an airbag device that deploys an airbag in front of the occupant; a movement direction detector that detects a direction in which a head region of the occupant will move relative to the vehicle at the time of frontal collision; an initial position detector that detects a position of the head region prior to the movement; and a control unit that makes a determination whether or not the head region will move outside of an area of protection by the airbag based on detection results of the movement direction detector and the initial position detector and, in a case in which the determination is affirmative, maintains the high load of the force limiter load.

9 Claims, 13 Drawing Sheets

(51) Int. Cl.
*B60R 11/04* (2006.01)
*B60R 21/0132* (2006.01)
*B60R 21/203* (2006.01)
*B60R 22/28* (2006.01)
*G01S 13/58* (2006.01)
*G01S 17/58* (2006.01)
*B60R 11/00* (2006.01)
*B60R 21/00* (2006.01)

(52) U.S. Cl.
CPC .............. *B60R 2011/0003* (2013.01); *B60R 2011/004* (2013.01); *B60R 2021/0004* (2013.01); *B60R 2021/01286* (2013.01)

(56) References Cited

U.S. PATENT DOCUMENTS

| | | |
|---|---|---|
| 2006/0022078 A1 | 2/2006 | Kitazawa et al. |
| 2011/0035117 A1* | 2/2011 | Yamada .............. B60R 22/4676 701/45 |
| 2015/0105982 A1* | 4/2015 | Okamura ............ B60R 21/0132 701/45 |
| 2015/0274106 A1* | 10/2015 | Lorenz .................. B60R 21/231 280/731 |
| 2016/0129868 A1* | 5/2016 | Choi ................. B60R 21/01552 280/735 |
| 2016/0257273 A1 | 9/2016 | Tada |
| 2017/0120851 A1 | 5/2017 | Gomez et al. |
| 2018/0236971 A1 | 8/2018 | Ohachi et al. |
| 2019/0291689 A1 | 9/2019 | Fujinami et al. |
| 2019/0351868 A1* | 11/2019 | Yao ........................ B60R 22/28 |

FOREIGN PATENT DOCUMENTS

| | | |
|---|---|---|
| JP | 2013-103603 A | 5/2013 |
| JP | 2016-165994 A | 9/2016 |
| JP | 2018-075877 A | 5/2018 |
| JP | 2018-131168 A | 8/2018 |

* cited by examiner

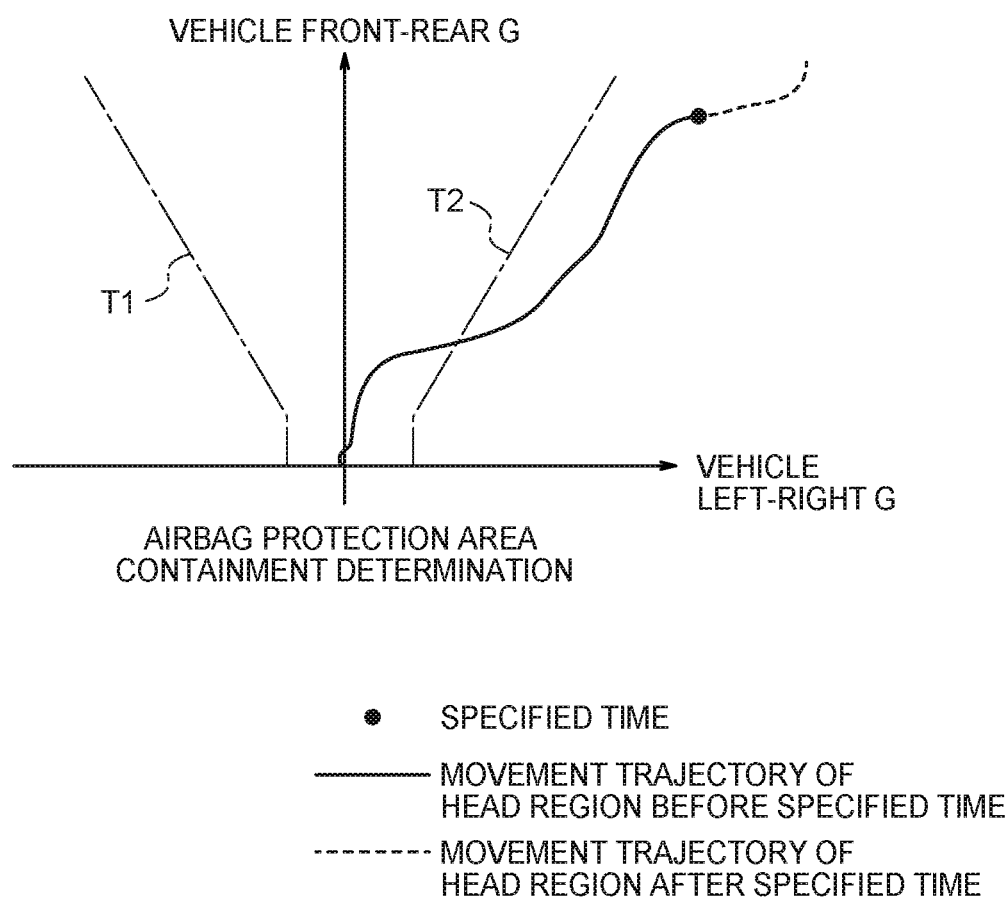

VEHICLE OCCUPANT PROTECTION DEVICE

CROSS-REFERENCE TO RELATED APPLICATION

This application is based on and claims priority under 35 USC 119 from Japanese Patent Application No. 2019-038357 filed on Mar. 4, 2019, the disclosure of which is incorporated by reference herein.

BACKGROUND

Technical Field

The present disclosure relates to a vehicle occupant protection device.

Related Art

Japanese Patent Application Laid-Open No. 2016-165994 describes an occupant protection device, and a program, that perform switching of a restraint load according to an occupant's physique by operating an airbag and by means of a seat belt. In this conventional technique, when it is determined that the occupant's physique is greater than or equal to a predetermined physique and that the vehicle width direction (vehicle left-right direction) acceleration lower than a predetermined value, the belt load is switched to a low load. As a result, the load that an occupant receives from the seat belt is reduced. However, when it is determined that the occupant's physique is greater than or equal to a predetermined physique and the vehicle left-right direction acceleration is greater than or equal to a predetermined value, the belt load is maintained at a high load. As a result, even when the occupant moves outside of a range protected by the airbag, the occupant is appropriately protected by the seat belt.

In the conventional technique described above, it is determined whether or not the occupant will be protected by the airbag, and the switching of the belt load is controlled, based only on the occupant's physique and the acceleration in the left-right direction of the vehicle. However, even with the same acceleration in the vehicle left-right direction, whether or not the occupant will be protected by the airbag changes depending on differences in acceleration in the vehicle front-rear direction and on the position of the occupant (initial position) when a frontal collision occurs. For this reason, in the conventional technique described above, there is a possibility that the belt load (force limiter load) cannot be appropriately switched.

SUMMARY

In view of the foregoing circumstances, the present disclosure aims to provide a vehicle occupant protection device that can accurately determine whether or not an occupant will be protected by an airbag and that can appropriately switch the force limiter load.

A vehicle occupant protection device according to a first aspect of the present disclosure includes: a seat belt device having a selectable force limiter that is configured to switch a force limiter load, which an occupant receives from a seat belt at a time of frontal collision of a vehicle, from a high load to a low load; an airbag device that deploys an airbag in front of the occupant at the time of frontal collision; a movement direction detector that detects a direction in which a head region of the occupant will move relative to the vehicle at the time of frontal collision; an initial position detector that detects a position of the head region prior to the movement; and a control unit that makes a determination whether or not the head region will move outside of an area of protection by the airbag based on detection results of the movement direction detector and the initial position detector and, in a case in which the determination is affirmative, maintains the high load of the force limiter load.

According to the first aspect, the movement direction detector detects a direction in which the head region of the occupant will move relative to the vehicle at time of frontal collision of the vehicle, and the initial position detector detects the position of the head region before the movement. Further, a control unit determines whether or not the occupant's head region will move outside of an area of protection by an airbag based on the detection results of the movement direction detector and the initial position detector. If this determination is affirmative—that is, if it is determined that the occupant's head region will move outside of the airbag protection area—the force limiter load is maintained at a high load. As a result, the occupant, whose head region will not be protected by the airbag, can be appropriately protected by the seat belt. In addition, since the above-described determination is made based on the direction in which the occupant's head region moves and the position of the head region before the movement (hereinafter, also referred to as the "initial position"), the accuracy of the determination can be improved. As a result, it is possible to appropriately switch the force limiter load.

A vehicle occupant protection device according to a second aspect of the present disclosure is that of the first aspect, in which the movement direction detector has a front-rear acceleration sensor that is provided at a floor portion of the vehicle and that detects acceleration in a vehicle front-rear direction, and a left-right acceleration sensor that is provided at the floor portion of the vehicle and that detects acceleration in a vehicle left-right direction.

In the second aspect, the vehicle front-rear acceleration and the vehicle left-right acceleration are detected by the front-rear acceleration sensor and the left-right acceleration sensor provided on the floor portion of the vehicle, and the movement direction of the occupant's head region is detected based on these accelerations. As a result, the movement direction of the occupant's head region can be detected with a simple configuration.

A vehicle occupant protection device of a third aspect of the present disclosure is that of the second aspect, in which: the control unit stores plural maps having acceleration in the vehicle front-rear direction as a vertical axis and acceleration in the vehicle left-right direction as a horizontal axis, and determination thresholds for determining whether or not the head region will move outside of the protection area are respectively set in advance in the plural maps in accordance with different positions of the head region prior to the movement.

In the third aspect, the control unit stores plural maps. In these maps, the vertical axis represents the vehicle front-rear acceleration, and the horizontal axis represents the vehicle left-right acceleration. Further, in these maps, determination thresholds for determining whether or not the head region will move outside of the area of protection by the airbag are set, respectively, in accordance with differences in the initial position of the head region. For this reason, the control unit selects a map according to a difference in the initial position of the head region, and also maps the respective accelerations detected by the front-rear acceleration sensor and the left-right acceleration sensor onto the map selected as described above and estimates the movement trajectory of the head region, whereby it is possible to determine with high accuracy whether or not the head region will move outside of the airbag protection area.

The vehicle occupant protection device of a fourth aspect of the present disclosure is that of the first aspect, in which: the control unit stores a time limit for a case in which the selectable force limiter is operated at the time of frontal collision, measures a time from detection of the frontal collision until the time limit with a timer, and determines whether or not the head region will move outside of the protection area within a specified time calculated from the time limit.

In the fourth aspect, the control unit stores a time limit for a case in which the selectable force limiter is operated at a time of frontal collision. This time limit is obtained, for example, as a test value (measured value) of a collision test. The control unit measures the time from detection of a frontal collision until the time limit with a timer, and determines whether or not the occupant's head region will move outside of the protection area within a specified time calculated from the time limit. As a result, it is possible to prevent the operation of the selectable force limiter (switching from a high load to a low load) from being too late; that is, it is possible to prevent a situation in which the effect of this switching is not obtained.

The vehicle occupant protection device of a fifth aspect of the present disclosure is that of the first aspect, in which the vehicle occupant protection device includes a severity detector for detecting the severity of the frontal collision, and in which the control unit maintains the force limiter load at the high load in a case in which a detection result from the severity detector exceeds a preset threshold.

In the fifth aspect, when the severity of the frontal collision (crash severity) detected by the severity detector exceeds a preset threshold value (that is, when the crash severity is high), the control unit maintains the force limiter load at a high load. As a result, when the crash severity is high, the occupant can be appropriately protected.

The vehicle occupant protection device of a sixth aspect of the present disclosure is that of the first aspect, in which the initial position detector has at least one of a seat position sensor that detects a position of a vehicle seat at which the occupant is seated or a vehicle interior camera that images the occupant.

In the sixth aspect, the initial position of the occupant is detected based on at least one of the position of the vehicle seat detected by the seat position sensor or an image of the occupant captured by the vehicle interior camera. When the seat position sensor is used, the configuration of the initial position detector can be simplified, and when the vehicle interior camera is used, the initial position of the head can be detected with high accuracy.

As described above, according to the vehicle occupant protection device according to the present disclosure, it can be accurately determined whether or not the occupant will be protected by the airbag, and the force limiter load can be appropriately switched.

BRIEF DESCRIPTION OF THE DRAWINGS

Exemplary embodiments of the present disclosure will be described in detail based on the following figures, wherein:

FIG. 5B is a diagram showing another example of an airbag protection area containment determination;

DETAILED DESCRIPTION

A vehicle occupant protection device 10 according to a first embodiment of the present disclosure is described using FIG. 1 through FIG. 8B. Note that arrow FR, arrow LH and arrow UP that are shown as appropriate in the respective drawings indicate the forward direction (forward travel direction), the leftward direction and the upward direction of a vehicle, respectively. Unless specifically stated otherwise, in the following explanation, simple reference to front and rear, left and right, and up and down directions refers to the front and rear in a vehicle front-rear direction, the left and right in a vehicle left-right direction (vehicle width direction), and up and down in a vehicle vertical direction.

(Configuration)

Figure 1:
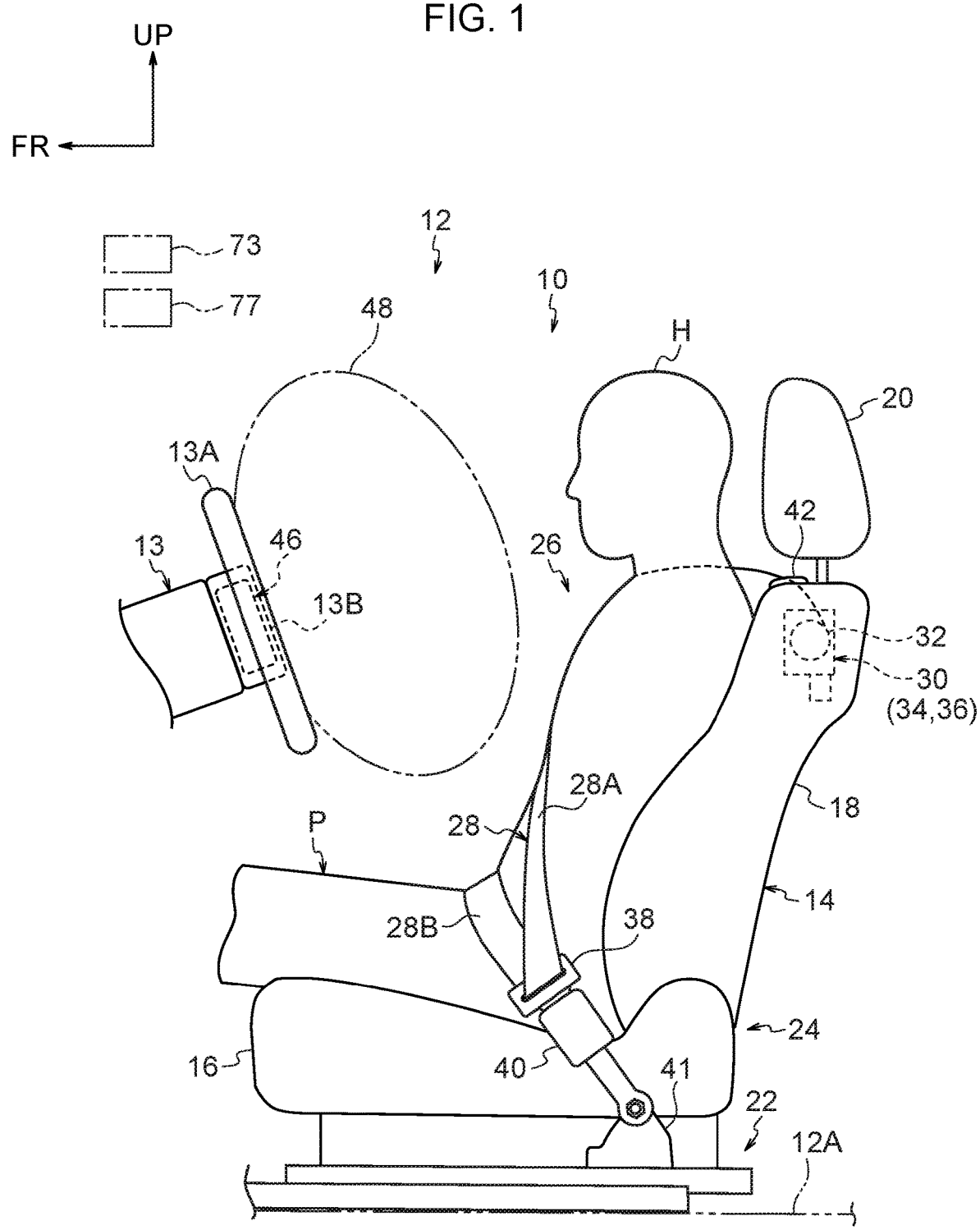
FIG. 1 is a side view illustrating a configuration in the vicinity of a driver's seat of a vehicle to which a vehicle occupant protection device according to an embodiment of the present disclosure is applied.
Figure 2:
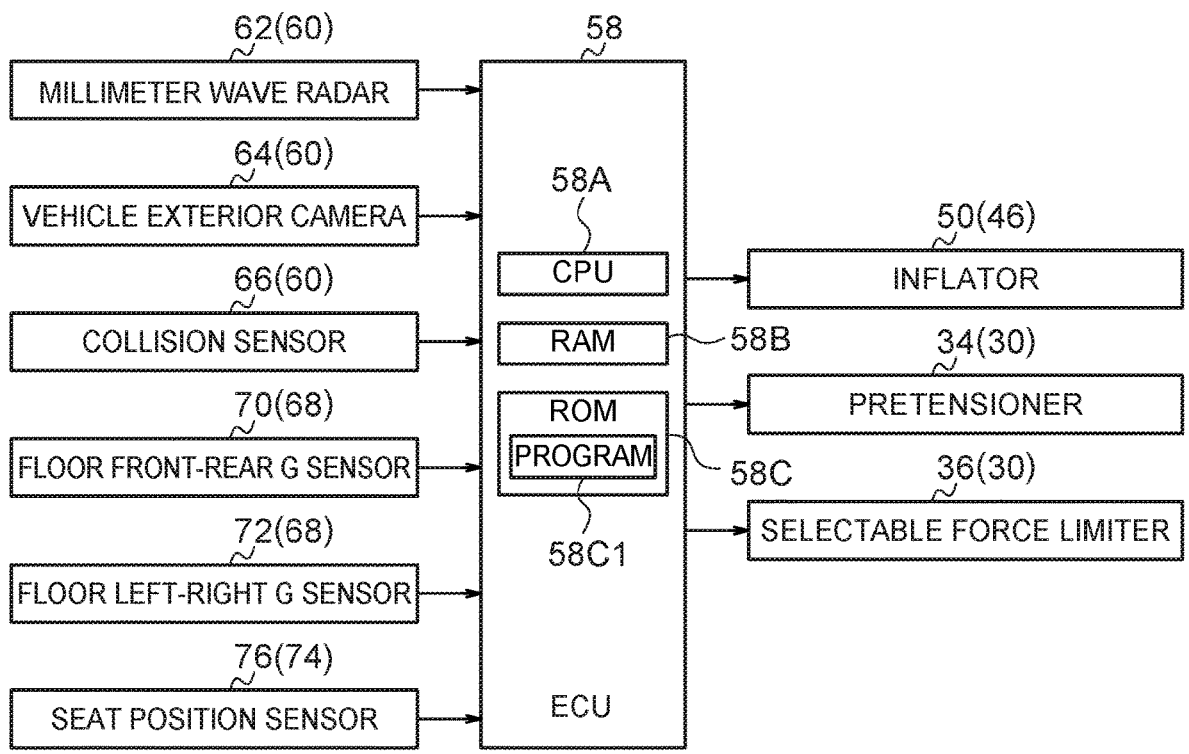
FIG. 2 is a block diagram illustrating a configuration of a vehicle occupant protection device according to an embodiment of the present disclosure.

As shown in FIGS. 1 and 2, the vehicle occupant protection device 10 according to an embodiment of the present disclosure includes a seat belt device 26, an airbag device 46, a millimeter wave radar 62, a vehicle exterior camera 64, a collision sensor 66, a floor front-rear G sensor 70 as a front-rear acceleration sensor, a floor left-right G sensor 72 as a left-right acceleration sensor, a seat position sensor 76, and an ECU (Electronic Control Unit) 58 as a control unit. The millimeter wave radar 62, the vehicle exterior camera 64, and the collision sensor 66 configure a severity detector 60, the floor front-rear G sensor 70 and the floor left-right G sensor 72 configure a movement direction detector 68, and the seat position sensor 76 configures an initial position detector 74.

A vehicle seat 14 that is a driver's seat is provided in the front part of the vehicle cabin of a vehicle 12 to which the vehicle occupant protection device 10 is applied. The configuration is such that the occupant (driver) P seated on the vehicle seat 14 is protected (restrained) by the seat belt device 26 and the airbag device 46 at a time of frontal collision of the vehicle 12.

Here, the vehicle seat 14 is a driver's seat arranged on the right side of the front part of the vehicle cabin. The vehicle seat 14 includes a seat cushion 16 on which an occupant P is seated, a seat back 18 that is tiltably connected to a rear end portion of the seat cushion 16, and a headrest 20 that is connected to an upper end portion of the seat back 18 and has adjustable height. The front-rear, left-right, and vertical directions of the vehicle seat 14 coincide with the front-rear, left-right, and vertical directions of the vehicle 12. In addition, when the vehicle seat 14 is disposed on the left side of the front part of the vehicle cabin, the configuration has left-right symmetry with the present embodiment.

The seat cushion 16 is connected to a floor portion 12A of the vehicle 12 via a slide mechanism 22 for adjusting the front-rear slide position of the vehicle seat 14. The rear end portion of the seat cushion 16 is connected to the lower end portion of the seat back 18 via a reclining mechanism 24 for adjusting the reclining angle of the seat back 18. The slide mechanism 22 is configured to slide the vehicle seat 14 back and forth with respect to the floor portion 12A by the driving force of a motor, and the reclining mechanism 24 is configured to tilt the seat back 18 back and forth around the lower end portion thereof by the driving force of a motor. Note that the slide mechanism 22 and the reclining mechanism 24 may be manually operated.

The seat belt device 26 applied to the vehicle seat 14 includes a three-point seat belt (webbing) 28, a retractor (webbing take-up device) 30, a tongue 38, and a buckle 40. The retractor 30 is disposed at an upper portion of the seat back 18, and the buckle 40 is disposed at a side (here, the left side) of the vehicle seat 12.

One end part (not shown) of the seat belt 28 is moored to an anchor plate (not shown) fixed to the seat cushion 16 or the slide mechanism 22 on the right side of the vehicle seat 14, and the other end of the seat belt 28 is moored to a take-up shaft 32 of the retractor 30. The retractor 30 is fixed to a frame (not shown) of the seat back 18.

A belt guide 42 having a longitudinal hole (belt insertion hole) (not shown) is attached to the upper end portion of the seat back 18, and the other end side of the seat belt 28 is inserted into the longitudinal hole of the belt guide 42. An intermediate portion of the seat belt 28 is inserted into a longitudinal hole (reference number omitted) formed in the tongue 38. Accordingly, the tongue 38 is slidably attached to the intermediate portion of the seat belt 28. The buckle 40 is disposed at a side (here, the left side) of the seat cushion 16, and is connected to the slide mechanism 22 via a bracket 41.

When the tongue 38 is connected to the buckle 40, a state is achieved in which the occupant P is wearing the seat belt 28. In this seat belt-wearing state, a portion of the seat belt 28 from the belt guide 42 to the tongue 38 is a shoulder belt 28A that restrains the shoulder to the abdomen of the occupant P, and a portion of the seat belt 28 from the tongue 38 to the anchor plate is a lap belt 28B that restrains the waist of the occupant P.

The above-described retractor 30 includes a pretensioner 34 and a selectable force limiter 36. The pretensioner 34 is configured to forcibly rotate the take-up shaft 32 in one direction around the axis (the take-up direction in which the seat belt 28 is taken up) at a time of frontal collision of the vehicle 12. The pretensioner 34 is, for example, an explosive-type pretensioner, and the configuration is such that the seat belt 28 is forcibly wound around the take-up shaft 32 (drawn into the retractor 30) by only a predetermined amount by rotation of the take-up shaft 32 caused by ignition of the explosive. Operation of the pretensioner 34 is controlled by an ECU 58 that is described below.

The selectable force limiter 36 (SFL) is configured so as to allow rotation of the take-up shaft 32 in the other direction around the axis (the pull-out direction for pulling out the seat belt 28)—that is, to allow only a fixed amount of pull-out of the seat belt 28 from the retractor 30—at a time of frontal collision of the vehicle 12, and so as to apply a limit load (force limiter load) to this pulling out. The selectable force limiter 36 can switch the above-described force limiter load received by the occupant P from the seat belt 28 at a time of frontal collision of the vehicle 12, from a high load to a low load. As the selectable force limiter 36, the conventionally known selectable force limiters disclosed, for example, in JP-A Nos. 2013-103603, 2016-165994, 2018-075877, and 2018-131168, can be applied. The operation of the selectable force limiter 36 is controlled by an ECU 58 that is described below. Note that the specific configuration of the selectable force limiter 36 is not an essential portion of the present embodiment, and therefore, description thereof is omitted.

The airbag device 46 is a driver's seat airbag device mounted at a steering device 13 of the vehicle 12, and includes an airbag 48 sewn in a bag shape, and an inflator 50 that supplies inflation gas into the airbag 48 (see FIG. 2; not shown in FIG. 1). The airbag 48 is normally modularized together with the inflator 50 in a folded state, and is covered with a hole pad 13B (not shown) provided at the center of a steering wheel 13A. The airbag 48 is inflated by the pressure of gas generated by the inflator 50, and is deployed toward the rear side of the steering wheel 13A; that is, in front of the occupant P (see the two-dot chain line in FIG. 1). When the airbag 48 is deployed, the wheel pad 13B is broken at a tear line (thin wall portion). The operation of the inflator 50 is controlled by the ECU 58.

The ECU 58 is an airbag ECU that is a control device of the airbag device 46, for example, and is disposed at the floor portion 12A of the vehicle 12 below a center console (not shown). The ECU 58 is configured by a microcomputer including a CPU (central processing unit) 58A, a RAM (random access memory) 58B, and a ROM (read-only memory) 58C, and opens a program 58C1, stored in the ROM 58C, in the RAM 58B for execution by the CPU 58A. The ECU 58 has a timer for measuring time at a time of frontal collision of the vehicle 12. As shown in FIG. 2, the pretensioner 34, the selectable force limiter 36, and the inflator 50 are electrically connected to the ECU 58. The ECU 58 is electrically connected to the millimeter wave radar 62, the vehicle exterior camera 64, the collision sensor 66, the floor front-rear G sensor 70, the floor left-right G sensor 72, and the seat position sensor 76.

The millimeter wave radar 62 is disposed, for example, at the front end of the vehicle 12, and detects the relative speed between the vehicle 12 and a collision partner before frontal collision of the vehicle 12. Instead of the millimeter wave radar 62, a laser radar such as an infrared laser may be used. The vehicle exterior camera 64 is, for example, a stereo camera disposed at the front end portion of the vehicle cabin of the vehicle 12, and images the situation outside the vehicle. The collision sensor 66 is, for example, a front satellite sensor disposed at the front end of the vehicle 12, and detects acceleration at a time of frontal collision of the vehicle 12.

The floor front-rear G sensor 70 and the floor left-right G sensor 72 are provided in the ECU 58. The floor front-rear G sensor 70 detects acceleration in the vehicle front-rear direction (hereinafter also referred to as "vehicle front-rear G") at a time of frontal collision of the vehicle 12. The floor left-right G sensor 72 detects acceleration in the vehicle left-right direction at a time of frontal collision of the vehicle 12 (hereinafter also referred to as "vehicle left-right G"). The floor front-rear G sensor 70 and the floor left-right G sensor 72 configure a movement direction detector 68 that detects the direction in which the head region H of the occupant P will move relative to the vehicle 12 at a time of frontal collision of the vehicle 12. The above-described frontal collision includes symmetrical collisions (front collisions; full-wrapping frontal collisions) and also asymmetrical collisions such as diagonal collisions (oblique collisions) and minute overlap collisions (small overlap collisions).

The seat position sensor 76 detects the position (seat position) of the vehicle seat 14 with respect to the vehicle 12, and includes a slide position detection sensor and a reclining angle detection sensor (both not shown). The slide position detection sensor is provided in the slide mechanism 22, for example, and is configured to detect the front-rear slide position of the vehicle seat 14 with respect to the floor portion 12A based on the number of rotations of the motor of the slide mechanism 22. The reclining angle detection sensor is provided in the reclining mechanism 24, for example, and is configured to detect the reclining angle of the seat back 18 based on the number of rotations of the motor of the reclining mechanism 24. The seat position sensor 76 configures an initial position detector 74 that detects the position of the head region H of the occupant P before the occupant P moves inertially with respect to the vehicle 12 as a result of the impact of a frontal collision (hereinafter sometimes referred to as the "initial position"). For example, when the sliding range of the vehicle seat 14 in the vehicle front-rear direction is narrow, the initial position of the head region H may be detected based only on the reclining angle. Further, for example, when the reclining range of the vehicle seat 14 is narrow, the initial position of the head region H may be detected based only on the front-rear slide position.

The ECU 58 is configured to operate the inflator 50 and the pretensioner 34 when outputs from the collision sensor 66, the floor front-rear G sensor 70, and the floor left-right G sensor 72 exceed preset operation thresholds. Further, the ECU 58 detects the relative speed between the vehicle 12 and the collision partner, the size and weight of the collision partner, the manner of frontal collision, and the like based on outputs from the millimeter wave radar 62, the vehicle exterior camera 64 and the collision sensor 66, and determines the severity $\Delta V$ of the frontal collision (crash severity). When the ECU 58 determines that the frontal collision will be severe—that is, when the outputs from the millimeter wave radar 62, the vehicle exterior camera 64 and the collision sensor 66 exceed a preset severity threshold—the selectable force limiter 36 is deactivated, and the force limiter load is maintained at a high load (the high load is unchanged).

Further, the ECU 58 determines whether or not the head region H of the occupant P will move outside of the area of protection by the airbag 48 (hereinafter also referred to as the "airbag protection area") based on outputs from the floor front-rear G sensor 70, the floor left-right G sensor 72, and the seat position sensor 76 at a time of frontal collision of the vehicle 12. That is, when the frontal collision of the vehicle 12 is an asymmetrical collision such as an oblique collision or a minute overlap collision, the head region H moves inertially diagonally forward with respect to the vehicle 12. For this reason, the ECU 58 determines (estimates) whether or not the head region H will move outside of (depart from) the airbag protection area—that is, whether or not the head region H can be protected by the airbag 48—using the initial position of the head region H detected by the seat position sensor 76 and a time integration of the vehicle front-rear G and the vehicle left-right G detected by the floor front-rear G sensor 70 and the floor left-right G sensor 72. Hereinafter, this determination may be referred to as the "airbag protection area containment determination".

Further, the ECU 58 stores an operation threshold time (time limit; limit time) for when the selectable force limiter 36 is operated at a time of frontal collision of the vehicle 12. This operation threshold time is a time that is determined such that, when the operation threshold time is exceeded, the effect of the selectable force limiter 36 cannot be obtained even when the selectable force limiter 36 is operated. That is, after the occupant P, who moves inertially due to the impact of the frontal collision, receives a high load force limiter load from the seat belt 28, even if the force limiter load is switched to a low load, the effect of the switch cannot be obtained. For this reason, the ECU 58 stores an operation threshold time obtained as a test value (measured value) from collision testing.

This ECU 58 measures the time from the detection of the frontal collision of the vehicle 12 to the operation threshold time, using a timer. That is, the ECU 58 starts the timer at a time at which the outputs from the floor front-rear G sensor 70 and the floor left-right G sensor 72 have exceeded a preset timer activation threshold, and starts measuring the time until the operation threshold time. The ECU 58 is configured to perform the airbag protection area containment determination within a specified time calculated from the operation threshold time. The specified time is a time calculated as t1−t2=t3, when the operation threshold time is t1, the time from when the frontal collision of the vehicle 12 occurs until the timer is started is t2, and the above-described specified time is t3. For example, when the operation threshold time is 30 mmsec and the time from when the frontal collision of the vehicle 12 occurs until the timer is started is 10 mmsec, the specified time is 30 mmsec−10 mmsec=20 mmsec.

Figure 3:
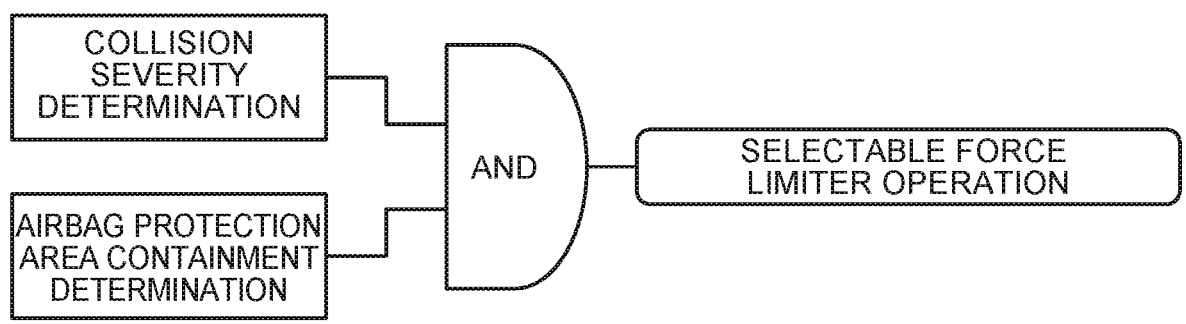
FIG. 3 is a logic diagram showing an AND circuit for determining the operation of a selectable force limiter.

When the ECU 58 makes a positive airbag protection area containment determination—that is, when it is determined that the head region H will not move outside the airbag protection area—the ECU 58 operates the selectable force limiter 36 to switch the force limiter load to a low load. However, when the ECU 58 makes a negative airbag protection area containment determination—that is, when it is determined that the head region H will move outside the airbag protection area—the ECU 58 deactivates the selectable force limiter 36 and maintains the force limiter load at a high load. That is, in this embodiment, as shown in FIG. 3, the operation of the selectable force limiter 36 is controlled by performing both of the determination of the frontal collision severity $\Delta V$ and the airbag protection area containment determination. The selectable force limiter 36 is configured to operate only when the pretensioner 34 is operated (that is, when any slack in the seat belt 28 has been eliminated).

Figure 4A:
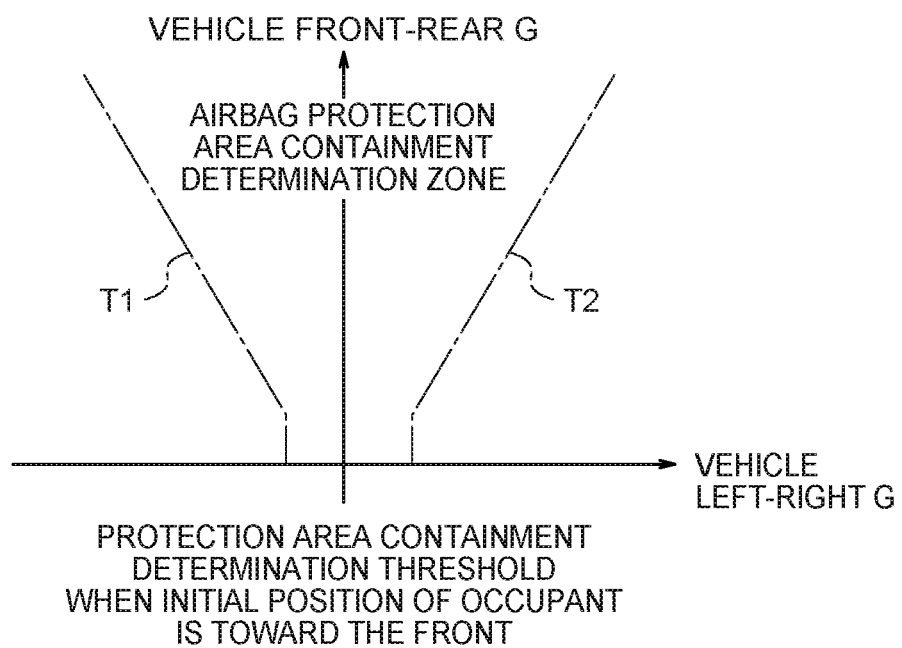
FIG. 4A is a diagram showing an example of a map stored in a control unit.
Figure 4B:
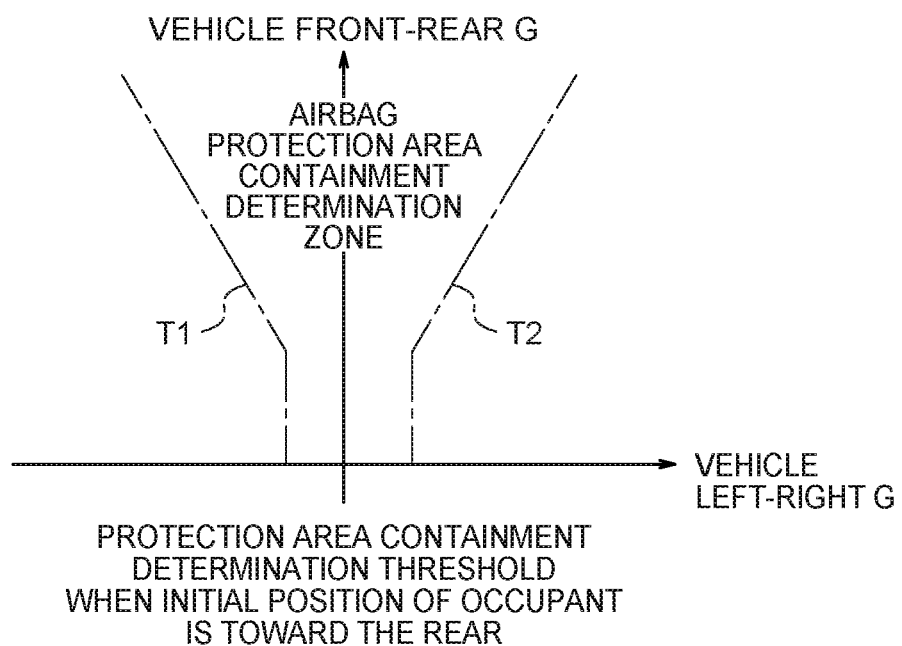
FIG. 4B is a diagram showing another example of a map stored in a control unit.

In the present embodiment, the ECU 58 stores plural maps (see FIG. 4A and FIG. 4B), and the airbag protection area containment determination is performed using these plural maps. The plural maps are established in a planar shape in which the vertical axis is the vehicle front-rear G and the horizontal axis is the vehicle left-right G. In these plural maps, determination thresholds T1 and T2 for determining whether or not the head region H of occupant P will move outside the airbag protection area are set, respectively, in accordance with differences in the initial position of the head region H. For example, FIG. 4A shows an example of a map when the initial position of the head region H is closer to the front of the vehicle, and FIG. 4B shows an example of a map when the initial position of the head region H is closer to the rear of the vehicle.

In each map, if the vehicle front-rear G and vehicle left-right G detected by the floor front-rear G sensor 70 and the floor left-right G sensor 72 are within the range between the determination thresholds T1, T2, it is assumed that the head region H will move within the airbag protection area, and if they are outside the range between the determination thresholds T1 and T2, it is assumed that the head region H will move outside the airbag protection area.

The ECU 58 selects one map from plural maps according to differences in the initial position of the head region H of the occupant P when making the airbag protection area containment determination. Then, the ECU 58 maps coordinates, having the components of the vehicle front-rear G and vehicle left-right G detected by the floor front-rear G sensor 70 and the floor left-right G sensor 72, to the selected map and estimates the movement trajectory of the head region H, whereby it is determined whether or not the head region H will move outside of the airbag protection area.

Figure 5A:
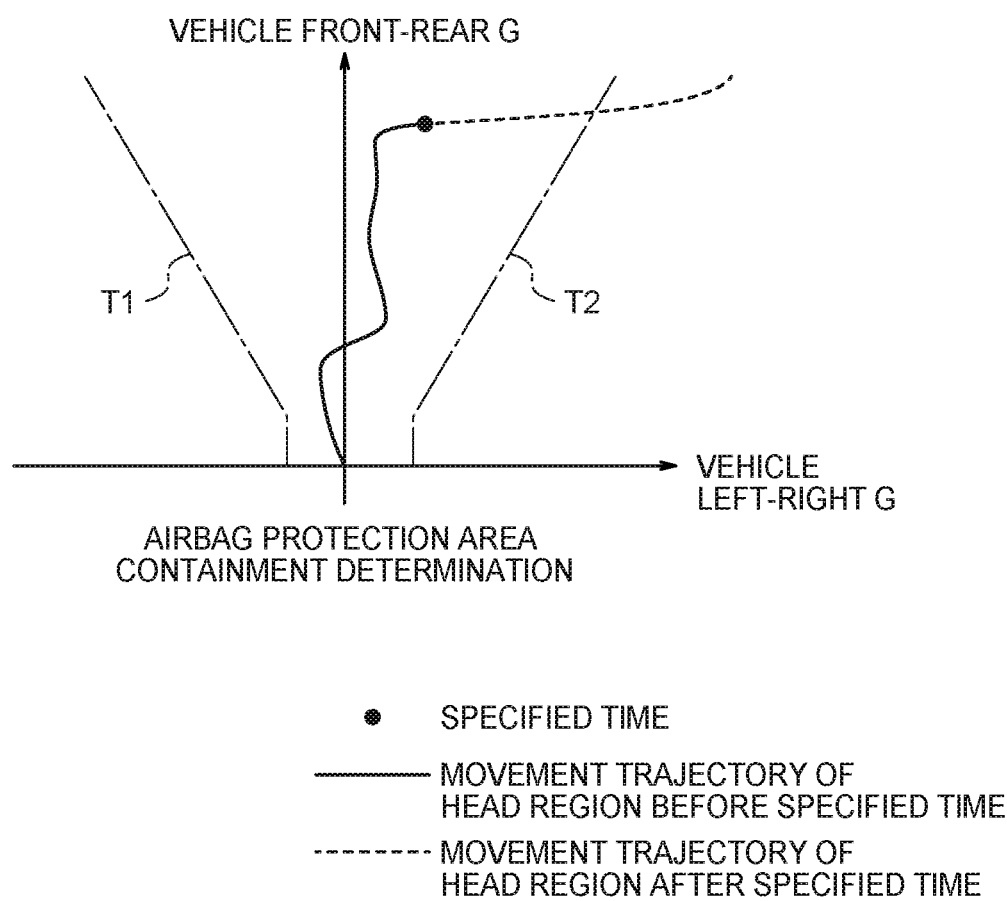
FIG. 5A is a diagram showing an example of an airbag protection area containment determination.
Figure 5C:
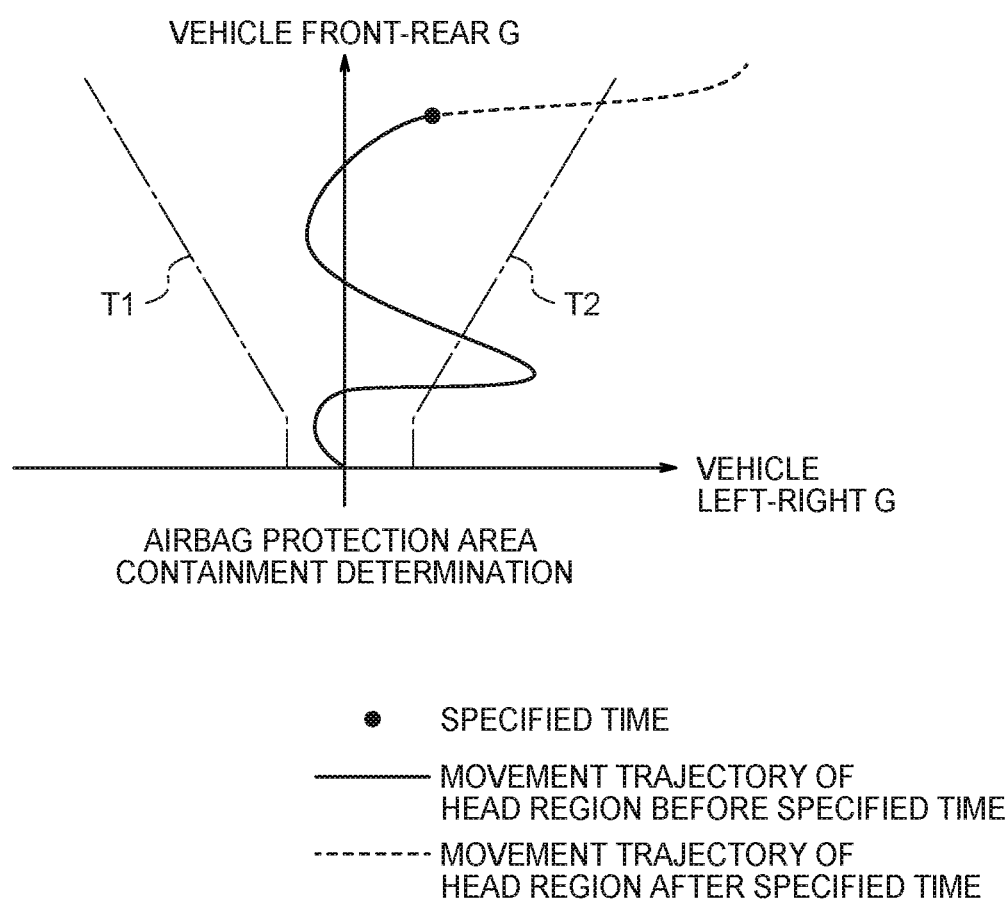
FIG. 5C is a diagram showing still another example of an airbag protection area containment determination.

For example, if, as shown in FIG. 5A, the movement trajectory of the head region H before the specified time elapses is within the range between the determination threshold values T1 and T2, the ECU 58 determines that the head region H will not move outside of the airbag protection area. Further, for example, if, as shown in FIGS. 5B and 5C, the movement trajectory of the head region H before the specified time elapses strays (protrudes) outside of the range between the determination threshold values T1 and T2, the ECU 58 determines that the head region H will move outside of the airbag protection area.

Figure 6:
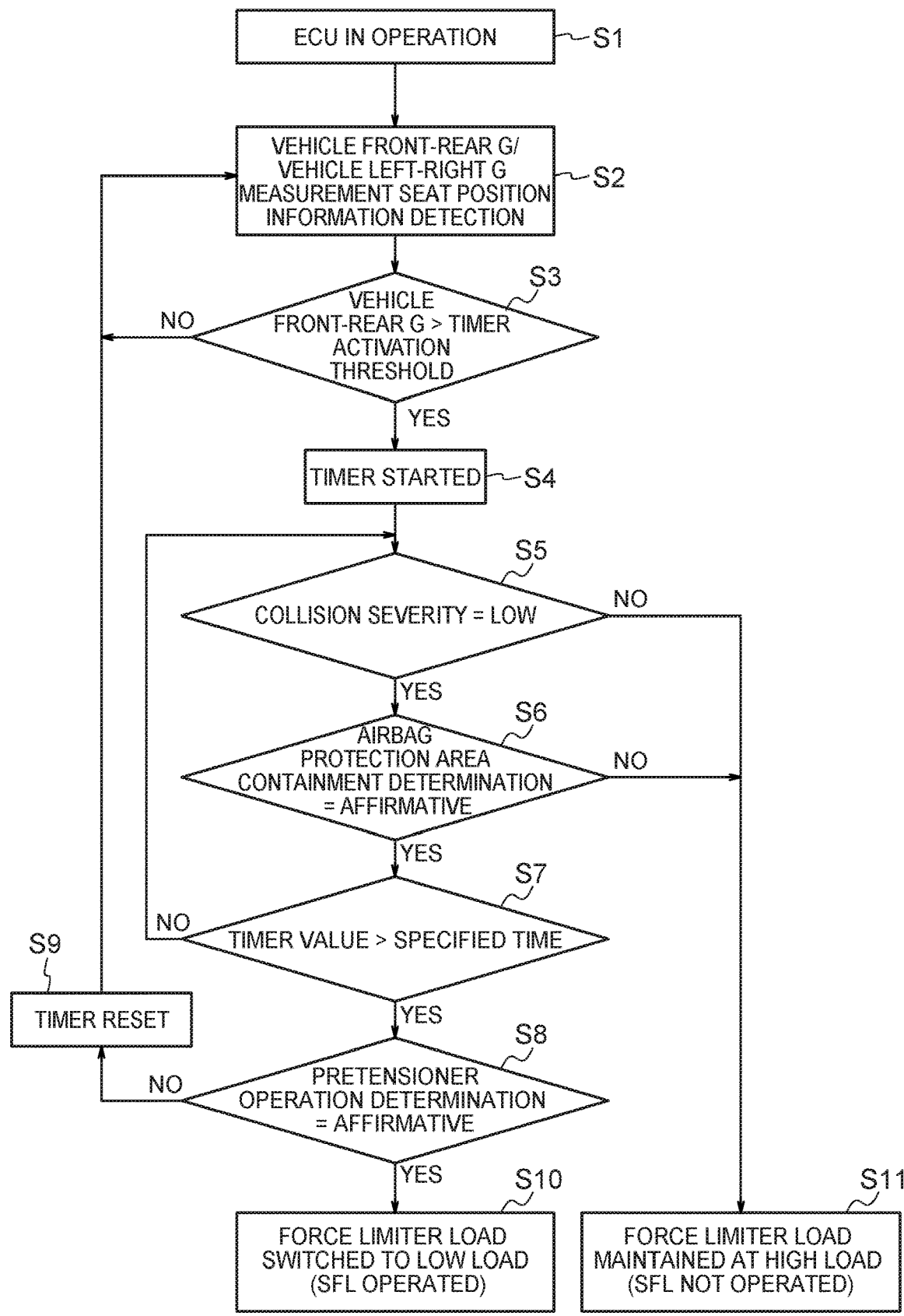
FIG. 6 is a flowchart showing a control procedure of a control unit.

Explanation follows regarding control processing executed by the ECU 58, with reference to the flowchart illustrated in FIG. 6. In the present embodiment, for example, when an ignition switch (not shown) of the vehicle 12 is turned on, the ECU 58 is operated (step S1). As a result, the ECU 58 starts execution of a control program, and the detection results of the vehicle front-rear G and the vehicle left-right G by the floor front-rear G sensor 70 and the floor left-right G sensor 72 and the detection result of the seat position by the seat position sensor 76 are acquired (step S2).

Next, in step S3, the ECU 58 determines whether or not the vehicle front-rear G and the vehicle left-right G have exceeded the timer activation threshold. If the determination is negative, the ECU 58 returns to step S2 to repeat the above-described processing. If the determination is affirmative, the ECU 58 proceeds to step S4 and starts the timer. When the processing of step S4 is complete, the ECU 58 moves the processing forward to the next step S5.

In step S5, the ECU 58 determines whether or not the frontal collision severity ΔV is low based on outputs from the millimeter wave radar 62, the vehicle exterior camera 64, and the collision sensor 66. Specifically, the ECU 58 determines that the frontal collision severity ΔV is not low when the outputs from the millimeter wave radar 62, the vehicle exterior camera 64, and the collision sensor 66 exceed preset severity thresholds, and the processing proceeds to S11. However, if the outputs from the millimeter wave radar 62, the vehicle exterior camera 64, and the collision sensor 66 do not exceed preset severity thresholds, the ECU 58 determines that the frontal collision severity ΔV is low, and the processing proceeds to step S6.

When the process proceeds to step S6, the ECU 58 executes the airbag protection area containment determination based on outputs from the floor front-rear G sensor 70, the floor left-right G sensor 72, and the seat position sensor 76. When the ECU 58 makes a negative airbag protection area containment determination—that is, when it is determined that the head region H will move outside the airbag protection area—the processing proceeds to step S11. However, if the ECU 58 makes a positive airbag protection area containment determination—that is, if it is determined that the head region H will not move outside the airbag protection area—the processing proceeds to step S7.

When the processing proceeds to step S7, the ECU 58 determines whether or not the time measured by the timer exceeds the specified time. If this determination is negative, the ECU 58 returns to step S5 to repeat the above-described processing. If the determination is affirmative, the processing proceeds to step S8.

When the processing proceeds to step S8, the ECU 58 determines whether or not the pretensioner 34 has operated. If this determination is negative, the ECU 58 proceeds to step S9 to reset the timer, and then proceeds to step S2 to repeat the above-described processing. However, when this determination is affirmative, the ECU 58 proceeds to step S10.

When the processing proceeds to step S10, the ECU 58 operates the selectable force limiter 36 so as to switch the force limiter load from a high load to a low load.

However, when the determination in step S5 or step S6 described above is negative and the processing proceeds to step S11, the ECU 58 does not operate the selectable force limiter 36 and maintains the force limiter load at a high load.

Action and Effects

The action and effects of the present embodiment are described next.

In the vehicle occupant protection device 10 configured as described above, the movement direction detector 68 (the floor front-rear G sensor 70 and the floor left-right G sensor 72) detects the direction in which the head region H of the occupant P will move relative to the vehicle 12 at a time of frontal collision of the vehicle 12, and the seat position sensor 76, as the initial position detector 74, detects the position of the head region H before the movement. Then, the ECU 58 determines whether or not the head region H will move outside the airbag protection area based on the detection results of the movement direction detector 68 and the seat position sensor 76. If this determination is affirmative—that is, if it is determined that the head region H will move outside the airbag protection area—the force limiter load is maintained at a high load. As a result, the occupant P, whose head region H will not be protected by the airbag 48, can be appropriately protected by the seat belt 28.

In addition, since the above-described determination is made based on the direction in which the head region H moves and the position (initial position) of the head region H before the movement, the accuracy of the determination can be improved. As a result, it is possible to appropriately switch the force limiter load. Supplementary explanation of this effect is provided with reference to FIGS. 7A to 8B.

Figure 7A:
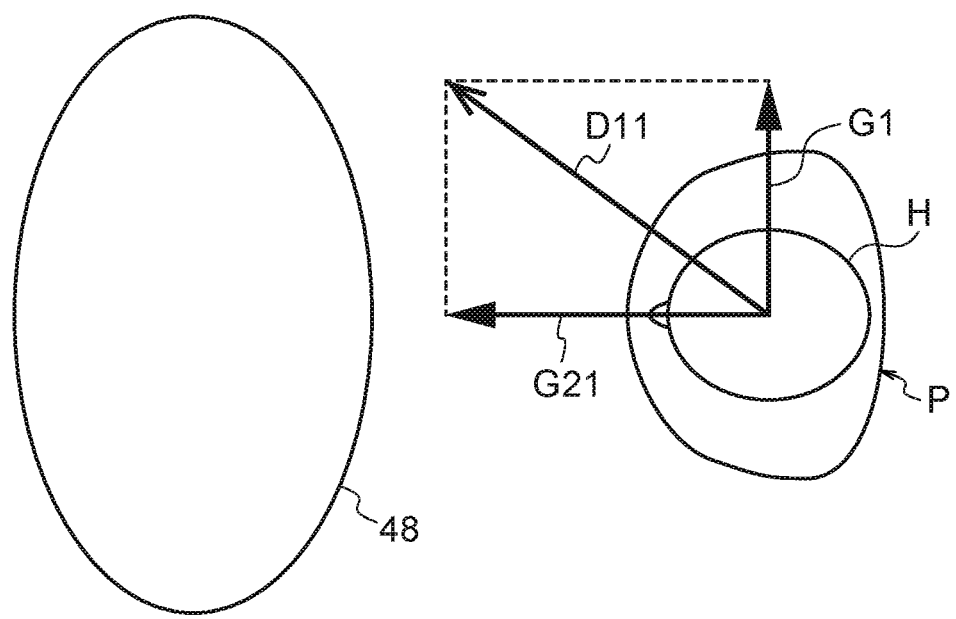
FIG. 7A is a plan view for explaining the relationship between acceleration generated at a time of frontal collision and a movement direction of a head region, and shows an example in which the head region cannot be protected by an airbag.
Figure 7B:
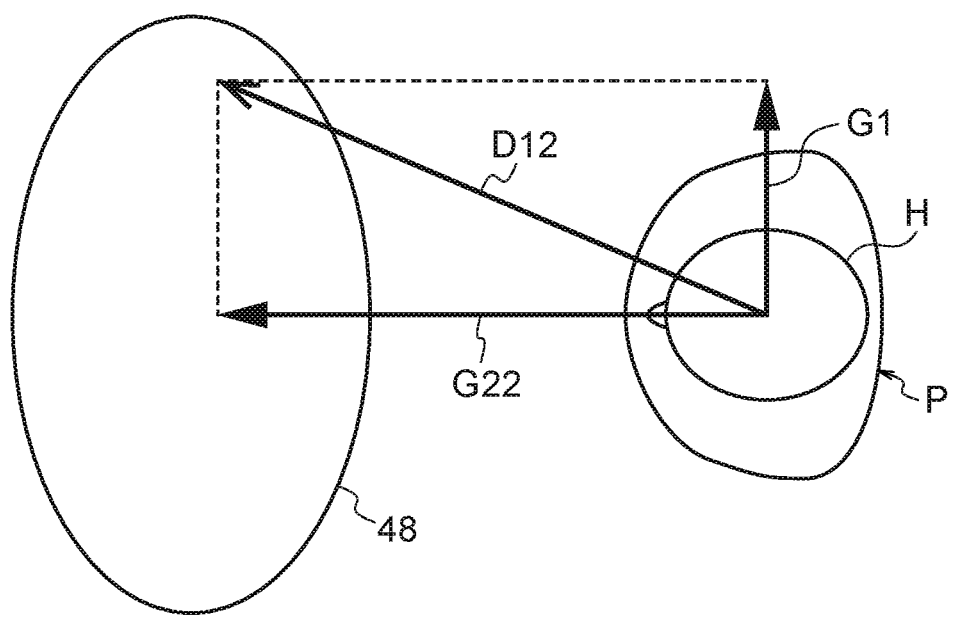
FIG. 7B is a plan view for explaining the relationship between acceleration generated at a time of frontal collision and a movement direction of a head region, and shows an example in which the head region can be protected by an airbag.

As shown in FIG. 7A and FIG. 7B, even if the vehicle left-right G at a time of frontal collision is the same size G1, owing to a difference in the sizes G21 and G22 of the vehicle front-rear G (G21<G22), the movement directions D11 and D12 of the head region H will change. That is, in the example shown in FIG. 7A, since the size G21 of the vehicle front-rear G is relatively small, the head region H will move outside of the airbag protection area and will not be protected by the airbag 48. In this case, it is necessary to maintain the force limiter load at a high load and to restrain the occupant P using the seat belt 28 alone. However, in the example shown in FIG. 7B, since the size G22 of the vehicle front-rear G is relatively large, the head region H is protected by the airbag 48 without moving outside of the airbag protection area. In this case, the force limiter load can be switched to a low load, and the occupant P can be restrained by the seat belt 28 and the airbag 48.

Figure 8A:
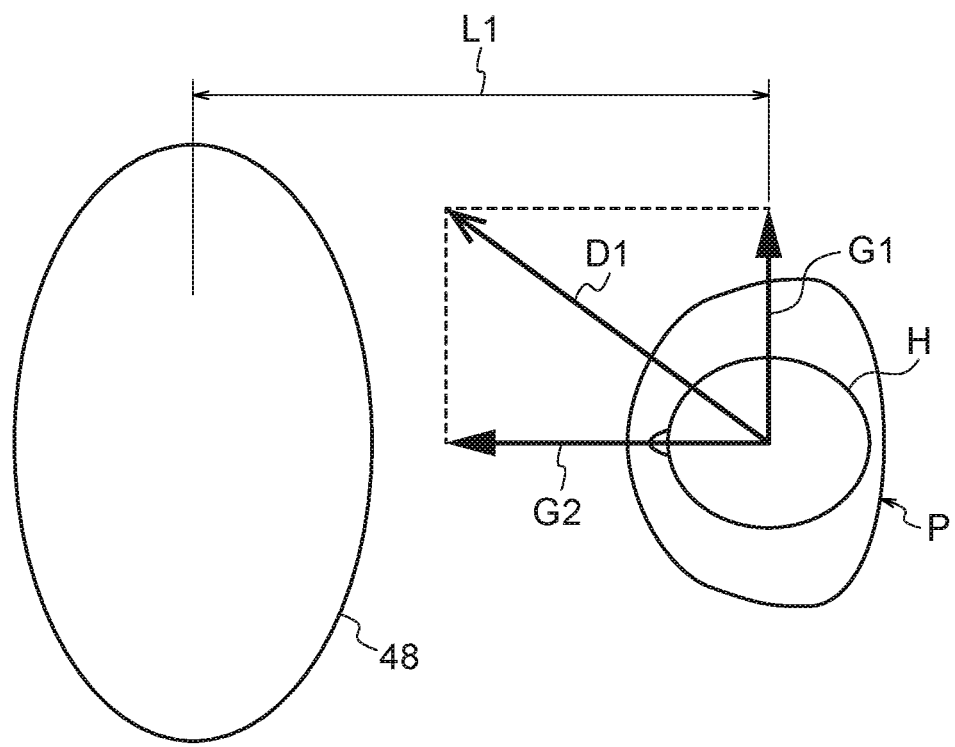
FIG. 8A is a plan view for explaining that the possibility of protection by an airbag differs depending on the position of a head region before moving relative to the vehicle owing to a frontal collision, and shows an example in which the head region cannot be protected.
Figure 8B:
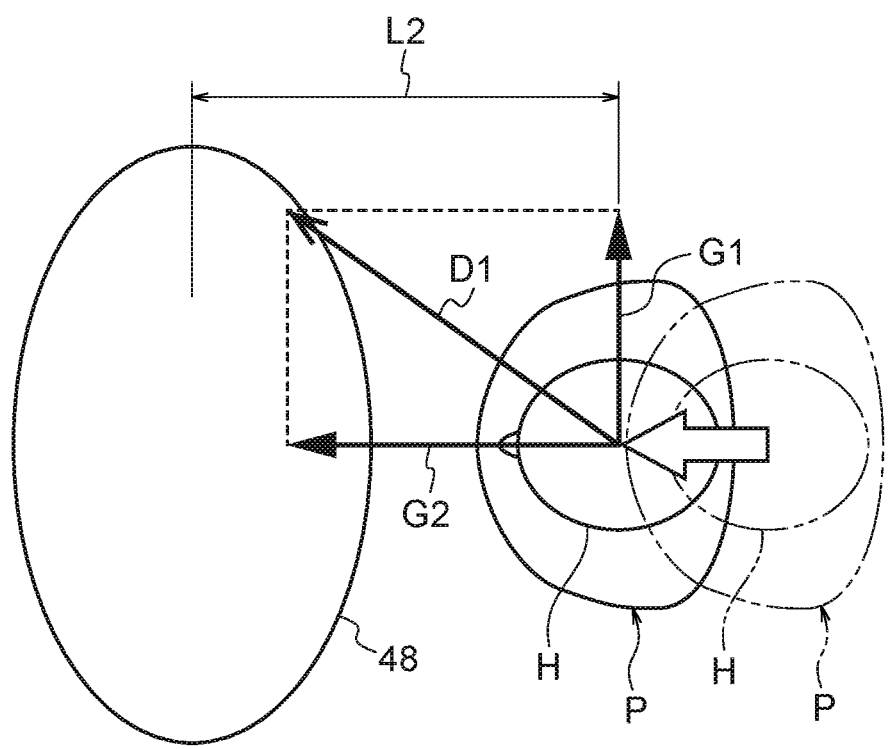
FIG. 8B is a plan view for explaining that the possibility of protection by an airbag differs depending on the position of a head region before moving relative to the vehicle due to a frontal collision, and shows an example in which the head region can be protected.

Further, as shown in FIGS. 8A and 8B, even if the vehicle front-rear G and the vehicle left-right G at a time of frontal collision are the same sizes G1 and G2, and the movement direction D1 of the head region H is the same direction, whether or not the head region H will be protected by the airbag 48 changes depending on a difference in the initial position of the head region H. That is, in the example shown in FIG. 8A, since the distance L1 between the head region H and the airbag 48 is relatively large, the head region H moves outside of the airbag protection area and is not protected by the airbag 48. In this case, it is necessary to maintain the force limiter load at a high load and to restrain the occupant P using the seat belt 28 alone. However, in the example shown in FIG. 8B, since the distance L2 between the head region H and the airbag 48 is relatively short, the head region H is protected by the airbag 48 without moving outside of the airbag protection area. In this case, the force limiter load can be switched to a low load and the occupant P can be restrained by the seat belt 28 and the airbag 48.

As described above, whether or not the head region H will be protected by the airbag 48 varies depending on the movement direction and the initial position of the head region H. In this embodiment, since the airbag protection area containment determination is performed based on the movement direction and the initial position of the head region H, the accuracy of the determination can be improved.

Moreover, in the present embodiment, the vehicle front-rear G and vehicle left-right G are detected by the floor front-rear G sensor 70 and the floor left-right G sensor 72 provided at the floor portion 12A of the vehicle 12, and the movement direction of the head region H is detected based on the vehicle front-rear G and vehicle left-right G. As a result, the movement direction of the head region H can be detected with a simple configuration.

In the present embodiment, the ECU 58 stores plural maps with the vehicle front-rear G as the vertical axis and the vehicle left-right G as the horizontal axis, and a determination threshold value for determining whether or not the head region H will move outside of the airbag protection area is respectively set in these plural maps according to differences in the initial position of the head region H. For this reason, the ECU 58 selects a map according to a difference in the initial position of the head region H, and also maps the vehicle front-rear G and vehicle left-right G detected by the floor front-rear G sensor 70 and the floor left-right G sensor 72 onto the map selected as described above and estimates the movement trajectory of the head region H, whereby it is possible to determine with high accuracy whether or not the head region H will move outside of the airbag protection area.

Further, in the present embodiment, the ECU 58 stores an operation threshold time (time limit) for cases when the selectable force limiter 36 is operated at a time of frontal collision of the vehicle 12. Then, the ECU 58 measures the time from the detection of the frontal collision of the vehicle 12 to the operation threshold time with a timer, and determines whether or not the head region H will move outside of the airbag protection area within the specified time calculated from the operation threshold time. As a result, it is possible to prevent the operation of the selectable force limiter 36 (switching from a high load to a low load) from being too late; that is, it is possible to prevent a situation in which the effect of this switching is not obtained.

In addition, the present embodiment includes a severity detector 60 (millimeter wave radar 62, vehicle exterior camera 64, collision sensor 66) for detecting the severity (crash severity) of a frontal collision of the vehicle 12, and the ECU 58 maintains the force limiter load at a high load when the severity ΔV of a frontal collision detected by the severity detector 60 exceeds a preset severity threshold (that is, when the crash severity is high). As a result, when the crash severity is high, the occupant P can be appropriately protected.

In the present embodiment, the seat position sensor 76 that detects the position of the vehicle seat 14 on which the occupant P is seated, is the initial position detector 74 that detects the initial position of the head region H. As a result, the structure of the initial position detector 74 can be simplified.

In the above-described embodiment, the seat position sensor 76 is configured as the initial position detector 74. However, the configuration is not limited thereto, and a vehicle interior camera 77 that images the occupant P may be configured as the initial position detector 74. In such a case, the initial position of the head region H can be detected with higher accuracy by analyzing an image captured by the vehicle interior camera 77.

In the above-described embodiment, the floor front-rear G sensor 70 and the floor left-right G sensor 72 are configured as the movement direction detector 68. However, the present disclosure is not limited thereto, and a vehicle interior camera that images the occupant P or an in-vehicle millimeter wave radar 73 that radiates millimeter waves toward the occupant P may be configured as the movement direction detector. In such a case, the movement direction of the head region H is detected by image analysis from the vehicle interior camera and/or by sensing by the in-vehicle millimeter wave radar.

Moreover, in the above-described embodiment, the millimeter wave radar 62, the vehicle exterior camera 64, and the collision sensor 66 are configured as the severity detector 60; however, the present disclosure is not limited to this. For example, the collision sensor 66 may be configured so as not to be included in the severity detector 60.

Various other modifications may be implemented within a range not departing from the gist of the present disclosure. Further, the scope of rights of the present disclosure is, of course, not limited to the foregoing embodiment.

What is claimed is:
1. A vehicle occupant protection device comprising:
a seat belt device having a selectable force limiter that is configured to switch a force limiter load, which an occupant receives from a seat belt at a time of frontal collision of a vehicle, from a high load to a low load;

an airbag device that deploys an airbag in front of the occupant at the time of frontal collision;

a movement direction detector that detects a direction in which a head region of the occupant will move relative to the vehicle at the time of frontal collision;

an initial position detector that detects a position of the head region of the occupant prior to movement of the head region of the occupant at the time of frontal collision; and a control unit that makes a determination whether or not the head region will move outside of an area of protection by the airbag based on detection results of the movement direction detector and the initial position detector and, in a case in which it is determined that the head region of the occupant will move outside of the area of protection by the airbag while the airbag is deployed, maintains the high load of the force limiter load, wherein the movement direction detector has a front-rear acceleration sensor that is provided at a floor portion of the vehicle and that detects acceleration in a vehicle front-rear direction, and a left-right acceleration sensor that is provided at the floor portion of the vehicle and that detects acceleration in a vehicle left-right direction, and a movement direction of the head region of the occupant is detected based on the acceleration in the vehicle front-rear direction and the acceleration in the vehicle left-right direction.

2. The vehicle occupant protection device of claim 1, further comprising a severity detector for detecting a severity of the frontal collision, wherein the control unit maintains the force limiter load at the high load in a case in which a detection result from the severity detector exceeds a preset threshold.

3. The vehicle occupant protection device of claim 1, wherein the initial position detector has at least one of a seat position sensor that detects a position of a vehicle seat at which the occupant is seated and a vehicle interior camera that images the occupant.

4. The vehicle occupant protection device of claim 2, wherein, among a millimeter wave radar or a laser radar that detects a relative speed between the vehicle and a collision partner before the vehicle collides frontally, a vehicle exterior camera that images a situation outside the vehicle, and a collision sensor that detects acceleration of the vehicle at the time of frontal collision, the severity detector includes at least the millimeter wave radar or the laser radar and the vehicle exterior camera.

5. The vehicle occupant protection device of claim 3, wherein the initial position detector has a seat position sensor, and the seat position sensor detects at least one of a front-rear slide position of the vehicle seat relative to the floor portion of the vehicle and a reclining angle of a seat back of the vehicle seat.

6. The vehicle occupant protection device of claim 1, wherein the movement direction detector has a vehicle interior camera that images the occupant or an in-vehicle millimeter wave radar that radiates millimeter waves toward the occupant.

7. A vehicle occupant protection device comprising:
a seat belt device having a selectable force limiter that is configured to switch a force limiter load, which an occupant receives from a seat belt at a time of frontal collision of a vehicle, from a high load to a low load;
an airbag device that deploys an airbag in front of the occupant at the time of frontal collision;
a movement direction detector that detects a direction in which a head region of the occupant will move relative to the vehicle at the time of frontal collision;
an initial position detector that detects a position of the head region of the occupant prior to movement of the head region of the occupant at the time of frontal collision; and
a control unit that makes a determination whether or not the head region will move outside of an area of protection by the airbag based on detection results of the movement direction detector and the initial position detector and, in a case in which it is determined that the head region of the occupant will move outside of the area of protection by the airbag while the airbag is deployed, maintains the high load of the force limiter load, wherein
the movement direction detector has a front-rear acceleration sensor that is provided at a floor portion of the vehicle and that detects acceleration in a vehicle front-rear direction, and a left-right acceleration sensor that is provided at the floor portion of the vehicle and that detects acceleration in a vehicle left-right direction,
the control unit stores a plurality of maps having acceleration in the vehicle front-rear direction as a vertical axis and acceleration in the vehicle left-right direction as a horizontal axis, and
determination thresholds for determining whether or not the head region of the occupant will move outside of the protection area are respectively set in advance in the plurality of maps in accordance with different positions of the head region of the occupant prior to the movement.

8. A vehicle occupant protection device comprising:
a seat belt device having a selectable force limiter that is configured to switch a force limiter load, which an occupant receives from a seat belt at a time of frontal collision of a vehicle, from a high load to a low load;
an airbag device that deploys an airbag in front of the occupant at the time of frontal collision;
a movement direction detector that detects a direction in which a head region of the occupant will move relative to the vehicle at the time of frontal collision;
an initial position detector that detects a position of the head region of the occupant prior to movement of the head region of the occupant at the time of frontal collision; and
a control unit that makes a determination whether or not the head region will move outside of an area of protection by the airbag based on detection results of the movement direction detector and the initial position detector and, in a case in which it is determined that the head region of the occupant will move outside of the area of protection by the airbag while the airbag is deployed, maintains the high load of the force limiter load, wherein
the control unit (i) stores a time limit for a case in which the selectable force limiter is operated at the time of frontal collision, (ii) measures a time from detection of the frontal collision until the time limit with a timer, and (iii) determines whether or not the head region of the occupant will move outside of the protection area within a specified time calculated from the time limit.

9. The vehicle occupant protection device of claim 8, wherein the specified time is calculated from $t1-t2=t3$, where t1 is the time limit, t2 is a time from when the control unit detects the frontal collision of the vehicle until the timer is activated, and t3 is the specified time.

* * * * *